Oct. 30, 1951     E. LINDSEY     2,573,462
TUBULAR ROTARY CUTTER
Filed Sept. 2, 1947
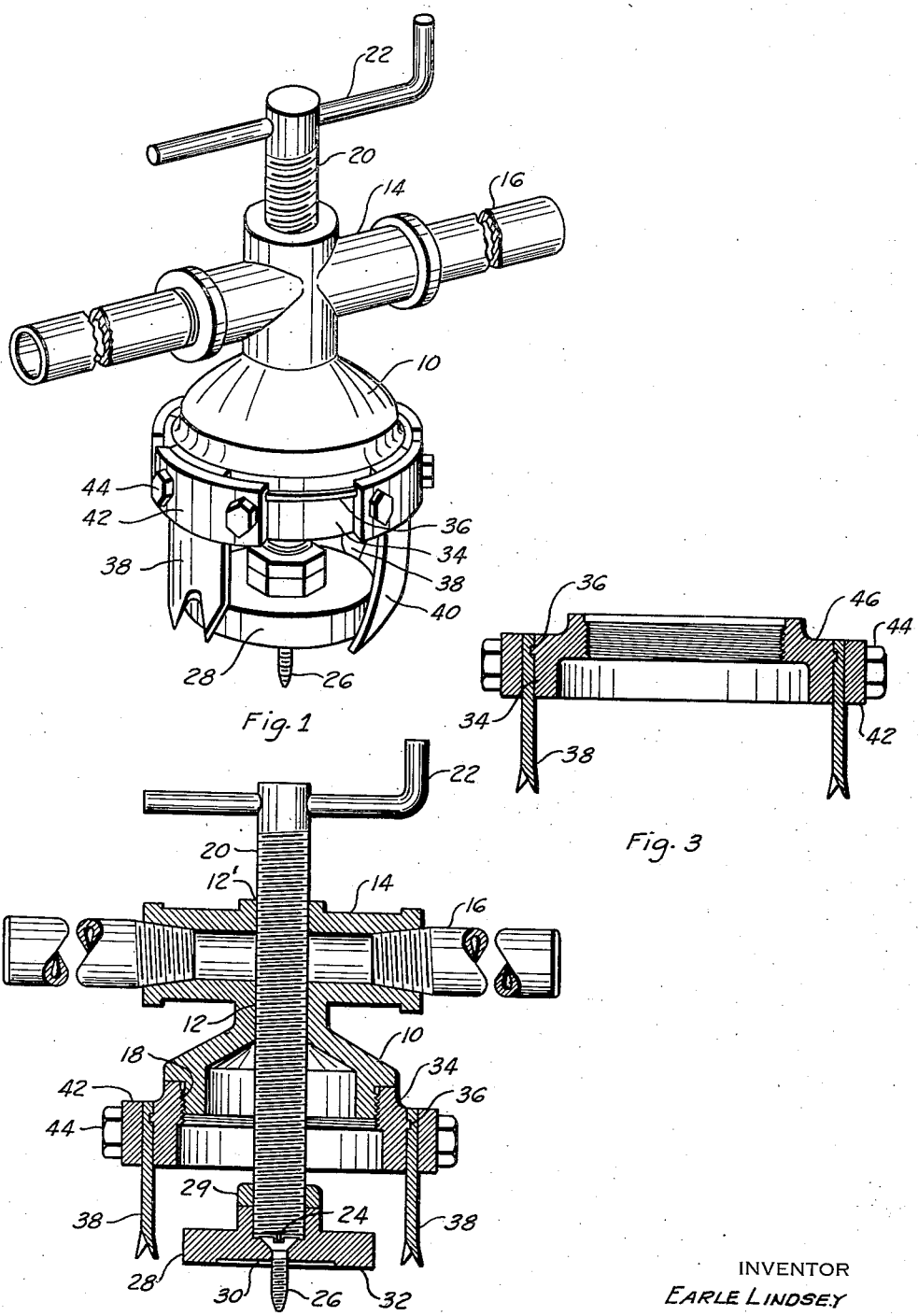
INVENTOR
EARLE LINDSEY
BY
Harry A. Mitman
ATTORNEY Patented Oct. 30, 1951

2,573,462

UNITED STATES PATENT OFFICE 2,573,462

TUBULAR ROTARY CUTTER

Earle Lindsey, Laurel, Miss.

Application September 2, 1947, Serial No. 771,765

1 Claim. (Cl. 145—120)

This invention relates to a cutting tool and has particular reference to a tool for cutting circular grooves and openings for reception of outlet boxes or the like in wood, plaster or similar materials. More specifically, the invention relates to improvements in circular cutting tools in which the cutters are mounted on an annular body member which moves on a lead or guide screw toward the surface being cut as the cutters are revolved about the guide screw.

In order to cut with sufficient speed to be of practical use, a cutting tool of this kind must have a plurality of cutters, which includes preferably at least two scoring cutters and at least two raking cutters mounted on a cutter ring. The efficiency of the tool depends almost entirely on the cutting points or edges of each cutter being in proper alignment so that each will perform its proper function.

An object of this invention is to provide an improved cutting tool provided with interchangeable round cutting heads, each cutting head including a plurality of cutters.

Another object is to provide an improved cutting tool provided with a recessed aligning disc adapted to align the tool at substantially right angles to the surface in which the cut is being made.

Another object is to provide an improved cutting tool with the recessed aligning disc provided with a hardened surface to resist the cutting action of metal cutting files.

A further object is to provide means on the cutter ring whereby the cutters mounted on the ring may be correctly positioned and retained in the correct position at all times.

With the above and other objects in view, the invention comprises a cutting tool with the construction arrangement and combination of parts as now to be fully described and claimed, it being understood that the disclosures herein are merely illustrative and not limiting, and that changes in detail of construction and arrangement of parts may be made so long as such changes fall within the scope of the claim.

In the accompanying drawing forming a part of this specification

Fig. 1 is a perspective view of the novel cutting tool,

Fig. 2 is a vertical section view of the tool, and

Fig. 3 is a sectional view of a modified cutter head suitable for cutting a larger hole than the cutter head illustrated on the tool in Figure 2.

Referring to the drawing and the reference numerals indicated therein, the tool comprises a metal annular body 10 provided with threaded openings 12 and 12' extending through the longitudinal center of the body. The body 10 is also provided with projections 14 to receive handles 16. At the lower portion of body 10 a threaded shoulder 18 is provided to receive cutting rings to be described below.

A guide screw 20, provided with threads similar to those found in the body openings 12 and 12', is screwed through the body openings. The guide screw has a removable handle 22 at the upper end, and at the lower end has a wedge shaped projection 24 adapted to engage the slot in the head of a screw member 26, as for example a common wood screw.

A metal disc 28, having an outside diameter substantially equal to the diameter of the threaded shoulder 18 and which is drilled and countersunk at the center to receive screw member 26, is secured to the lower portion of the guide screw 20. A jam nut 29 is provided to lock disc 28 on the guide screw 20.

The lower face of disc 28 has a recess 30 which recesses extend over the greater portion of the disc face area, thus providing shoulders 32 around the edges of the disc.

A cutter ring 34 having an inside threaded diameter equal to the threaded shoulder portion 18 is secured to body 10. The outer face of the ring has a projection 36 extending around the periphery of the cutter ring 34. A series of cutters, that is scoring cutters 38 and raking cutters 40, are provided, said cutters having slots near the upper edges to engage projection 36 of the cutter ring. When the desired number of cutters have been spaced on the cutter ring 34, the cutters 38 and 40 are clamped into place by means of plates 42. Bolts 44, extending through plates 42 and tapped into cutter ring 34, hold plates 42 firmly in place. In order to cut holes efficiently it is preferred that the cutter rings be provided with at least two scoring cutters 38 and at least two raking cutters 40.

In using the cutting tool, the screw member 26 is turned into the material to be cut by turning handle 22 on guide screw 20 thus bringing the shoulder 32 of disc 28 firmly against its surface. Since the disc covers a substantial area which is about equal to the diameter of shoulder portion 18 and since it is provided with recess 30, the tool will be firmly positioned and there will be no tendency for any rocking due to irregularities of the surface being cut. The cutting tool is positioned substantially at right angles to the surface to be cut.

Upon moving handles 16 around guide screw 20, the body 10 including the cutters 38 and 40, will advance toward the surface to be cut, and on contacting the surface will cut grooves into the material. The groove can be made to any depth, or if desired, the cut can be continued through the material to form a hole.

The cutting tool is provided with interchangeable cutting heads so that the tool may be useful in cutting grooves and holes of any diameter. This is accomplished by enlarging shoulder 46 to any dimension desired.

It is preferred that shoulders 32 of disc 28 be hardened sufficiently to resist the cutting action of metal files. When the shoulders are thus hardened, cutters 38 and 40 may easily be jointed and sharpened without removing the cutters from the cutter ring and without need of generally required tools necessary for sharpening saws and the like.

To make the cutters 38 and 40 operate efficiently, they must be jointed or equalized in length and where a combination of scoring and raking cutters are used, the raker cutters must be slightly shorter than the scorer cutter of the tool. This difference in length must be maintained within relatively narrow limits.

In order to use the disc 28 and shoulders 32 as a jointing device, the guide screw 20 is adjusted so that a plane extended across the hardened shoulder 32 just touches the tips of the shortest cutter 38. A metal cutting file is then placed flat against the hardened surface 32 and the cutters 38 are filed to the same length, that is, the cutters are jointed. The guide screw 20 is then turned a definite part of a turn and the rakers 40 are then jointed in the same way as cutters 38. The hardened surface on disc 28 is of sufficient area so that the jointing can be without removing screw member 26.

The side walls of disc 28 may also be used as a gauge for adjusting or aligning the scoring cutters 38 and raking cutters 40 if any of the cutters have become bent.

After the cutters are jointed and aligned, the cutter assembly is removed from body 10 and the points on the teeth are filed while the cutters are still mounted on cutter ring 34.

From the foregoing description the construction, operation and advantages of the improved cutting tool will be readily understood. The cutting tool is simple in construction while at the same time, it is very accurate and efficient in its operation and can be operated by any person to cut circular grooves and holes wherever needed. The cutting tool as described and claimed herein is practical and useful for electricians to cut holes in walls for outlet boxes.

I claim:

A cutting tool comprising an annular body provided with a shoulder to receive a cutter ring, a guide screw threaded in and extending through said annular body provided with means at the upper end to rotate said screw and at the lower end with a projection, a recessed disc having a hardened lower end surface to resist the cutting action of metal files and having a diameter substantially equal to the diameter of the shoulder on the annular body secured to the lower portion of said guide screw, a screw member having a slotted head portion engaging the projection and having the shank portion thereof extending through the disc, a cutter ring provided with a plurality of cutters mounted on said shoulder of the body, and means to rotate the annular body around the guide screw.

EARLE LINDSEY.

REFERENCES CITED

The following references are of record in the file of this patent:

UNITED STATES PATENTS

| Number | Name | Date |
|---|---|---|
| 170,527 | Crammer | Nov. 30, 1875 |
| 352,003 | Rhodes | Nov. 2, 1886 |
| 359,296 | Tower | Nov. 15, 1887 |
| 458,640 | Phillips | Sept. 1, 1891 |
| 691,629 | Holbrook | Jan. 21, 1902 |
| 858,293 | Johnson | June 25, 1907 |
| 2,306,807 | Hulney | Dec. 29, 1942 |